United States Patent [19]
Heiberger

[11] 3,848,165
[45] Nov. 12, 1974

[54] BIDIRECTIONAL ZERO SPEED SWITCH
[75] Inventor: Francis E. Heiberger, Elmhurst, Ill.
[73] Assignee: Danly Machine Corporation, Chicago, Ill.
[22] Filed: Oct. 25, 1973
[21] Appl. No.: 409,437

[52] U.S. Cl. ............... 318/207 R, 318/289, 318/293
[51] Int. Cl. ............................................. H02p 1/40
[58] Field of Search ........ 318/206 R, 207 R, 207 H, 318/284, 289, 293

[56] References Cited
UNITED STATES PATENTS
| | | | |
|---|---|---|---|
| 3,214,664 | 10/1965 | Ishikawa | 318/207 R |
| 3,253,202 | 5/1966 | Cotton | 318/207 R |
| 3,708,719 | 1/1973 | Ishikawa | 318/207 R |

Primary Examiner—G. Z. Rubinson
Attorney, Agent, or Firm—Wolfe, Hubbard, Leydig, Voit & Osann, Ltd.

[57] ABSTRACT

An interlocking control for a three-phase induction motor which by monitoring the voltage on the three-phase supply lines detects the presence of motor rotation and determines the direction thereof. The circuit includes operational amplifiers which monitor the voltage present on two of the three-phase supply lines with respect to the third phase, this monitored voltage being dependent upon generator action of the motor while coasting. The presence of a signal at the output of the operational amplifiers indicates the presence of motor rotation. The output signals of the operational amplifiers are coupled into logic circuitry to determine the direction of rotation, the output of the logic circuitry serving to drive silicon controlled rectifiers which in turn control interlocking relays. The contacts of these interlocking relays are disposed in the motor control circuit so as to prevent the sudden reversal of a rotating motor before it has come to rest, while allowing reenergization of a rotating motor in the same direction.

6 Claims, 6 Drawing Figures

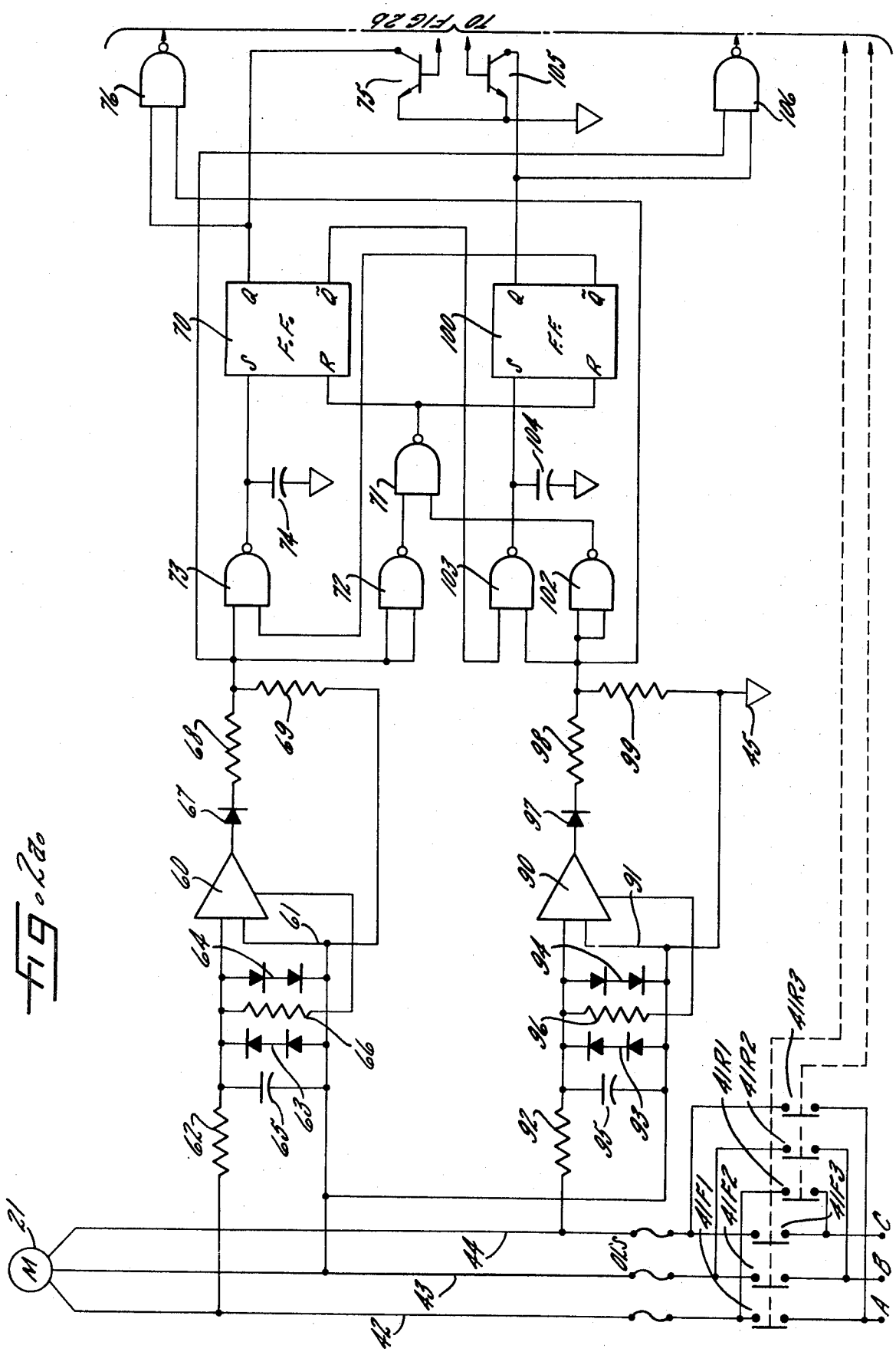

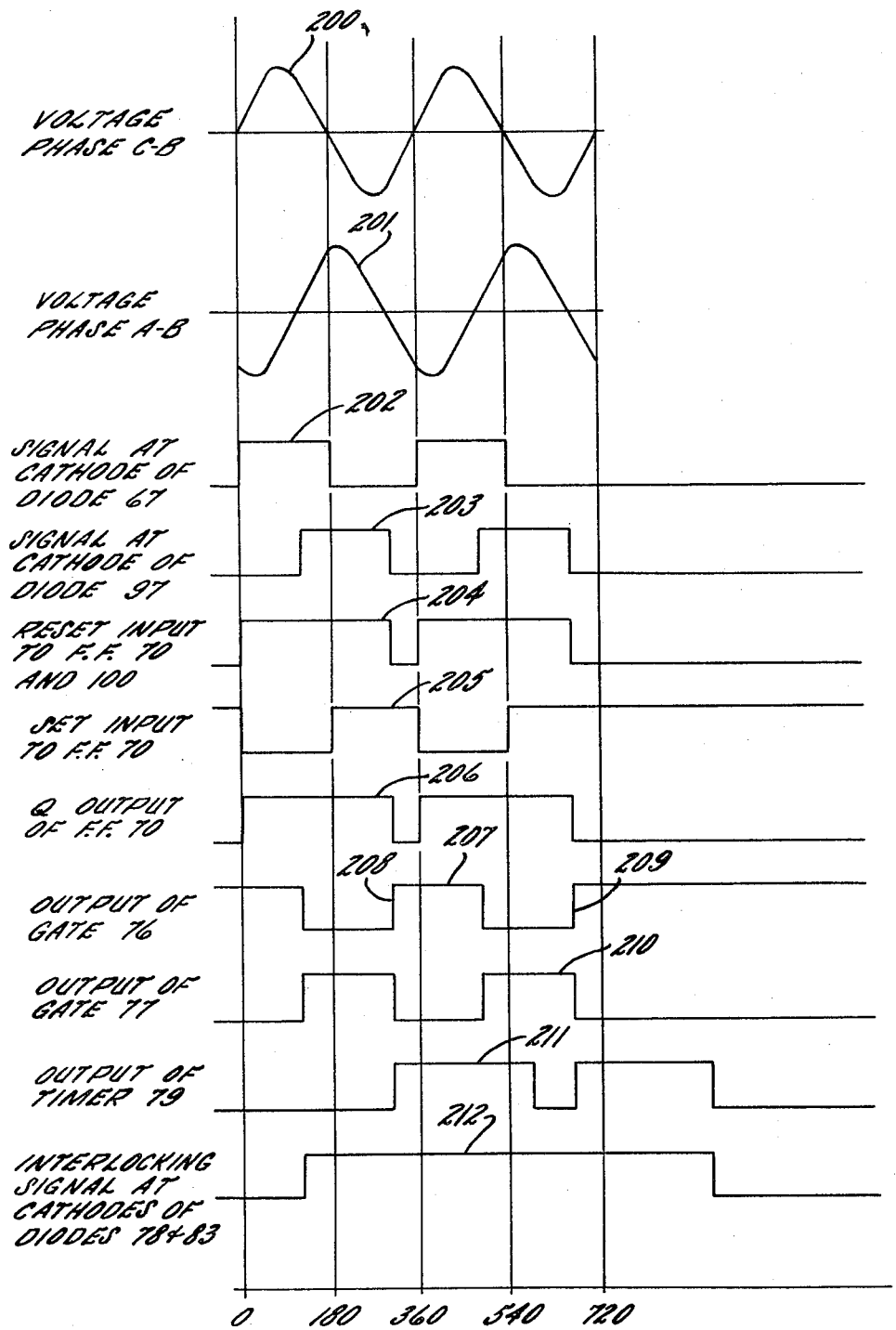

3,848,165

1

BIDIRECTIONAL ZERO SPEED SWITCH

This invention relates generally to an interlocking control for use with reversible electrical motors, which electrically detects the fact and direction of motor rotation and which acts to prevent the sudden reversal of a rotating motor. More particularly it relates to means conveniently referred to as bi-directional "zero speed" switch, which detects the presence and direction of motor rotation by monitoring the voltage on the three-phase motor supply lines, and interlocks the motor control circuit to prevent "plugging" reversal of a rotating motor but which allows reenergization in the existing direction of rotation.

Heretofore "zero speed" switches have used switches of the mechanical type physically attached to the motor being controlled. Use of mechanical switches is accompanied by several disadvantages: Coupling to the motor is difficult since it is necessary to provide an auxiliary power take-off on the motor, usually in the form of a second motor shaft, requiring motors of special manufacture. Alternatively, special gearing must be used. In the case of power presses the motor is usually in a remote, elevated or inferior location; thus placing the "zero speed" switch at the motor makes for difficult servicing and requires additional wiring between the motor and its control. In addition, mechanical "zero speed" switches exposed to the industrial environment are difficult to protect against damage and entry of foreign matter.

Accordingly, it is a primary object of this invention to provide novel means for sensing motor rotation and direction thereof by means associated with the motor control, but physically remote from the motor itself. It is a more specific object to sense the presence and direction of rotation of a three-phase a-c. motor by monitoring the three-phase supply lines which feed that motor.

It is a further object of this invention to provide a static "zero speed" switch, utilizing solid state electronics which is indirectly, rather than directly, responsive to shaft rotation but which is nevertheless more reliable than directly responsive switches. It is a related object to provide a "zero speed" switch capable of operation throughout the speed range of its associated motor and which is highly reliable from rated motor speed down to very slow coasting speeds.

It is a general object to provide a "zero speed" switch which may be used to actuate safety appliances used with equipment such as a power press and which is capable of meeting and exceeding the most exacting safety regulations.

Other objects and advantages of the invention will become apparent upon reading the following detailed description and upon reference to the drawings, in which:

FIG. 1 is a view of a power press in which a "zero speed" switch is utilized.

FIGS. 2a and 2b when combined form a diagram, partly is schematic and partly in block form, showing a preferred embodiment of the invention.

FIG. 4 is a timing diagram illustrating wave forms at various points in the circuit of FIG. 2.

2

Figure 2:
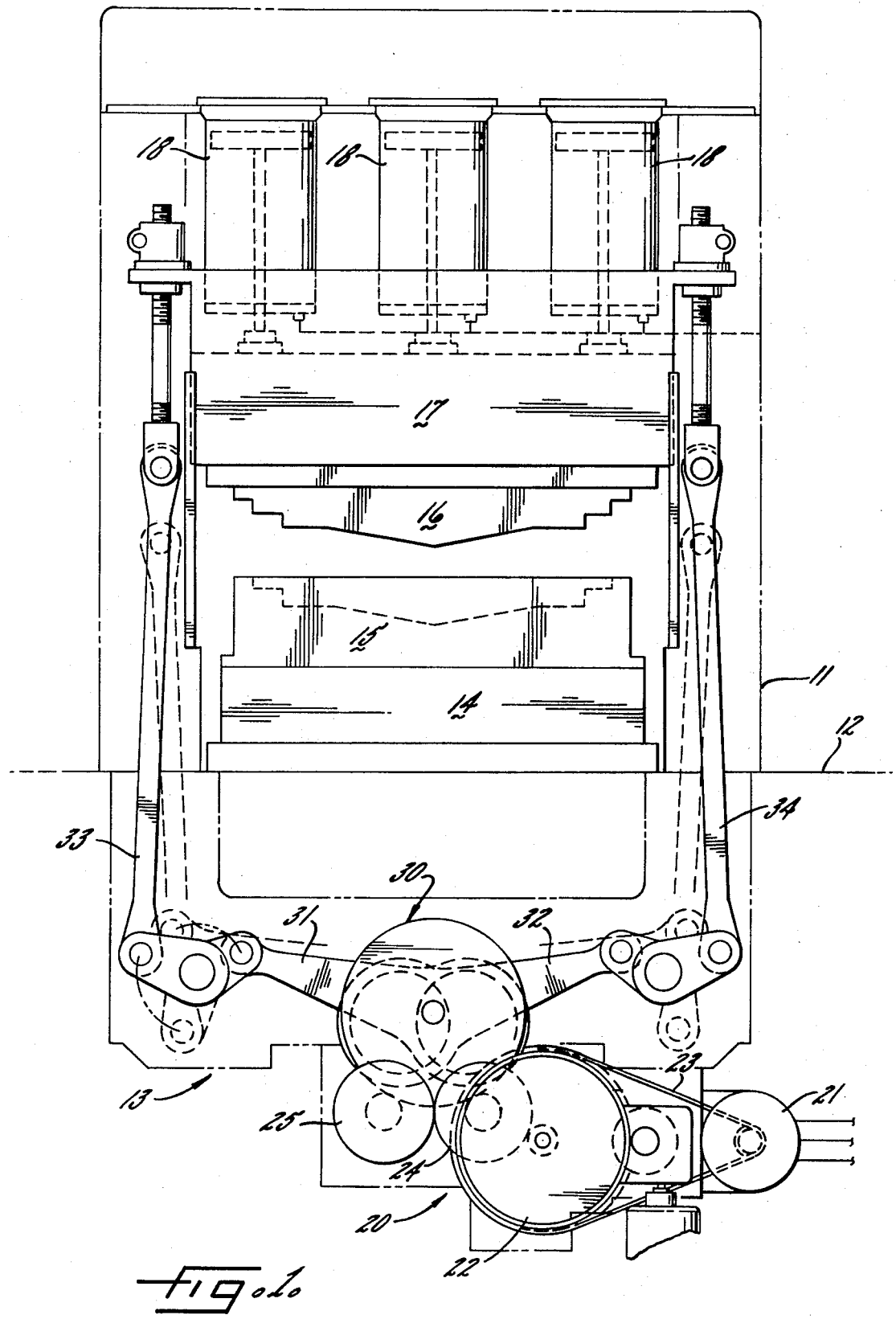

While the present invention will be described with reference to certain preferred embodiments, it should be understood that there is no intention to limit the invention to the specific forms disclosed, but, on the contrary, the intention is to cover all modifications, alternative constructions and equivalents falling within the spirit and scope of the appended claims.

Referring now to the drawings, FIG. 1 illustrates a power press 20, a typical application for the invention taught herein.

The press includes an inverted U-shaped frame 11 projecting above the floor 12 and having a recessed portion or base 13 which extends below the floor level on which is mounted a bolster 14. Supported on the bolster is the lower die 15 which cooperates with an upper die 16 mounted upon a slide 17, the weight of the slide being counterbalanced by air cylinders 18.

For reciprocating the slide a drive mechanism 20 is employed (for details of the drive mechanism reference may be had to prior Sindelar U.S. Pat. No. 3,719,445). It will suffice to say that the mechanism includes a three-phase motor 21 driving a fly wheel 22 via belt 23 where the fly wheel rotates a pair of gears 24, 25, which, via a system of eccentrics 30, impart equal and opposite motion to linkages 31, 32, which reciprocate vertically extending links 33, 34, the upper ends of the links being coupled to the slide 17.

Turning next to FIG. 2a, the motor 21 will be understood to be a three-phase induction motor to which three-phase power is supplied through reversing starter 41 via motor supply lines 42, 43 and 44. It is well known to those skilled in the art that three-phase power is generally of sinusoidal nature with each phase displaced by one third of a cycle or 120° from its associated phases. It is further known that application of these phase displaced voltages to their respective poles (or groups of poles), in a three-phase motor causes the motor to rotate in a given direction, that direction dependent on phase rotation and pole placement; also, since the three-phases are cyclic, interchanging of the phases on any two poles (or groups of poles), causes a reversal of rotation. In FIG. 2a the three-phase power supply is shown with a phase rotation of A-B-C. It is seen that if starter contacts 41F-1, 41F-2 and 41F-3 are closed, this rotation is cyclicly imposed on lines 42, 43 and 44 respectively, causing the motor to rotate in a given direction herein defined as clockwise. It is further seen that if contacts 41R-1, 41R-2 and 41R-3 are closed, the phases on lines 42 and 44 are interchanged, causing the phase rotation to be cyclicly imposed on lines 44, 43 and 42, respectively, causing a counter-clockwise rotation.

The direction of motor rotation is controlled via these two groups of contacts by a motor control circuit, a typical form of which is illustrated. Ignoring for the moment the presence of contacts labeled CRR and CRF by considering them short circuited, the operation of the circuit without the inventive feature will be described. Two-position selector switch 50 controls contacts 50F and 50R. In the "REV" position as shown, contact 50R bridges the circuit between the start push button 51 and contact 41F-4 while holding open the circuit between the start push button and contact 41R-4. In the "FOR" position contact 50F is closed and 50R is opened. With the circuit in the condition shown, depression of normally open start push button 51 allows current flow from the source, through the normally closed stop push button 52, through the depressed start push button 51, through contact 50R of selector switch 50, through normally closed contact 41F-4, through coil 41R, back to the source. This current flow energizes coil 41R, closing normally open power contacts 41R-1 through 41R-3, providing three-phase power to the motor, causing counterclockwise rotation. In addition it opens normally closed interlock contact 41R-4 which prevents any current flow to coil 41F, and further closes normally open holding contacts 41R-5, providing a path for current around start push button 51 such that coil 41R will remain energized after start push button 51 is released. In order to stop the motor, normally closed stop button 52 is depressed interrupting the current flow through coil 41R, deenergizing it. If it is desired to reverse the direction of motor rotation, selector switch 50 is put into its opposite position ("FOR" in this illustration), causing contact 50F to bridge the circuit between start push button 51 and contact 41R-4. Depression of start push button 51 will provide current flow to the coil 41F thus activating contacts 41F-1 through 41F-5 causing clockwise rotation of the motor. However, it is seen that this reversing operation can be initiated while motor 21 is still rotating in the counterclockwise direction causing excessive loading on the motor. In accordance with the invention to be described below contacts CRR and CRF are inserted into the motor control circuit and controlled so as to prevent this reversing operation until the motor has come to rest.

This "zero speed" interlocking is accomplished in the following manner: As described above the voltages impressed on motor feed lines 42, 43 and 44 by the three-phase power supply are always 120° out of phase, the phase rotation impressed on the motor being determined by the energization of either contacts 41F or 41R. In addition, under the condition when the three-phase supply is disconnected from the motor feed lines but while the motor is coasting, voltages are impressed on the feed lines 42, 43 and 44 by the motor 21 acting as a generator. The voltages thus impressed have the same characteristics as the three-phase supply except that they are much less in magnitude. That is, the voltages impressed by coasting 21 on motor feed lines 42, 43 and 44 are 120° out of phase, their relative phase being determined by the direction of motor rotation. Thus, the voltages on motor feed lines 42, 43 and 44 can be analyzed to determine both the fact of motor rotation and the direction thereof both when the motor is being powered from the three-phase supply and also when it has been disconnected from that supply but is coasting to a halt.

The presence of these voltages is sensed by amplifiers 60 and 90. These amplifiers are of a type commercially available and can be implemented by means well known to the art; therefore they will be described only functionally. As used in this embodiment of the invention they are of the non-inverting type; that is, a positive signal at the input will result in a positive output while a negative signal at the input will result in a negative output. However it is realized that inverting amplifiers could be used as well.

As illustrated in the circuit by logic common point 45, the reference point for the circuit is taken as one of the three-phase lines, shown in the circuit as feed line 43. If a four-wire three-phase wye power system were used, the reference point could also be taken as the grounded neutral. This circuit reference or ground point is connected to the reference input of amplifiers 60 and 90 via conductors 51 and 91 respectively. The input of amplifier 60 is connected to motor feed line 42 through resistor 62. Resistor 62 and diodes 63 and 64 form a clipper circuit which limits the magnitude of the signal imposed on the amplifier input. Thus, for example, if the signal on line 42 is of large magnitude and positive with respect to line 43 current would flow through resistor 62 and diodes 64. The voltage at the input of the amplifier would be effectively limited to the forward drop of the diodes 64, the excess voltage being dropped across resistor 62. In like manner, if the signal on line 42 is of large magnitude and negative with respect to line 43, current would flow through resistor 62 and diodes 63 again limiting the signal at the input of the amplifier to the forward diode drop of diodes 63, with the excess voltage being dropped across resistor 62. In addition capacitor 65 is disposed across the input to the amplifier for purposes of transient suppression. The input signal for amplifier 90 is derived from motor feed line 44 with respect to line 43. Just as amplifier 60 it has a clipper circuit composed of resistor 92 and diodes 93 and 94, and also a transient suppression capacitor 95. Resistors 66 and 96 are associated respectively with amplifiers 60 and 90; their function is to act as clamping bias resistors to prevent amplifier drift. It should be noted that amplifiers 60 and 90 are applied in the open loop mode, providing a voltage gain of up to several thousand, thus allowing the circuit to react to very small voltages on the motor feed lines.

The output of amplifier 60 is coupled through diode 67 and a voltage divider composed of resistors 68 and 69 into logic circuitry to be described below. The function of diode 67 is to pass only positive excursions of the amplifier output, while blocking negative excursions which would damage the logic circuitry. The voltage divider composed of resistors 68 and 69 is used to provide an attenuated voltage compatible with the logic circuitry. In like manner the output of amplifier 90 is coupled through diode 97 and a voltage divider composed of resistors 98 and 99 into the logic circuitry.

The relationship of the input voltages and output signals can be described with reference to FIG. 4, which is a timing diagram of wave forms at various points in the circuit of FIG. 2. The first two traces illustrate two cycles of sine waves typical in three-phase power applications. Trace 200 illustrates the voltage measured at phase C with respect to B. Trace 201 illustrates the voltage at phase A with respect to B. It is seen that trace 200 leads trace 201 by 120°. In the following example it will be assumed that power is applied to the motor by energizing coil 41R thus closing contacts 41R-1 to 41R-3. This causes imposition of phases C, B and A on motor feed lines 42, 43 and 44 respectively, causing counterclockwise motor rotation. Thus, the voltage illustrated by trace 200 is applied to the input of amplifier 60, while the voltage illustrated by trace 201 is applied to the input of amplifier 90. It should be noted that after contacts 41R-1 to 41R-3 are opened, the counterclockwise motor rotation imposes signals of this same nature on the amplifier input until the motor has come to rest. The output of the amplifiers in response to these input signals measured at the cathodes of diodes 67 and 97 respectively is illustrated by traces 202 and 203. It is seen that the output signal remains at the zero level whenever its corresponding input is either zero or negative. Likewise the output signal goes positive whenever the input signal goes positive. Therefore it is seen that the output signals are of approximately 180° duration and are 120° out of phase. As shown in the diagram there is a portion of motor rotation shown as approximately 120° to 180° where the output signals from both amplifiers are positive. Likewise there is a portion of motor rotation shown from approximately 300° to 360° where the output signals from both amplifiers are zero. The relative phase of these output signals is compared by the logic circuitry to determine the direction of motor rotation.

The logic circuitry contains numerous two input NAND gates. These are circuits well known to the art and therefore will be described only functionally. Their mode of operation is that the output is low or at logic 0 if and only if both inputs are high or at logic 1. If either input is at logic 0 its corresponding output will be at logic 1. The logic circuitry also contains two bistable elements or flip flops. These elements are also well known in the art and will be described in functional terms only. Each flip flop has two inputs (set and reset) which are normally held at logic 1 and two outputs (Q and $\overline{Q}$) which normally assume opposite logic states. The state of the Q and $\overline{Q}$ outputs can be changed only by imposing a logic 0 on the set or reset inputs. Imposition of a logic 0 on the set line causes the flip flop to assume and maintain the set condition (Q high and $\overline{Q}$ low). Imposition of a logic 0 on the reset line causes the flip flop to assume and maintain the reset condition (Q low and $\overline{Q}$ high). These set or reset states are maintained after their respective input signals are removed and until the opposite input signal is imposed on its corresponding input. Thus, the state of the flip flop outputs indicates which of the set or reset lines was last driven low.

Referring again to FIG. 2a, there are seen flip flops 70 and 100, with their reset lines commoned and driven by NAND gate 71. One input to NAND gate 71 is the output signal of amplifier 60 inverted by NAND gate 72. The other input is provided by the output of amplifier 90 inverted by NAND gate 102. Thus, during the time when the outputs of both amplifiers 60 and 90 are low, both inputs to NAND gate 71 are high and its corresponding output is low. This imposes a logic 0 on the reset lines to both flip flops 70 and 100 driving both Q outputs low and both $\overline{Q}$ outputs high. This condition arises in two separate situations: (a) when the motor is at rest, and no power is being applied from the three-phase supply, the input to both amplifiers is zero, holding both amplifier outputs at zero, (b) is described above, when the motor is rotating either due to the application of power, or is coasting to a halt there is one portion of motor rotation (shown as 300° to 360° on FIG. 4) in which the outputs of both amplifiers are low. Both of these conditions reset the flip flops.

The signal to set flip flop 70 is provided by NAND gate 73; similarly the signal to set flip flop 100 is provided by NAND gate 103. It is seen that one input of NAND gate 73 is driven by the output signal of amplifier 60. The second input is connected to the $\overline{Q}$ output of flip flop 100. Similarly one output of NAND gate 103 is driven by the output signal of amplifier 90, while the other input is connected to the $\overline{Q}$ output of flip flop 70.

It is recalled that the $\overline{Q}$ outputs of the two flip flops are high when the flip flops are in the reset condition. Thus, both NAND gates 73 and 103 are prepared to respond to a signal from their corresponding amplifier when the flip flops are in the reset state, a condition existing while the motor is at rest, and also occurring once during each motor revolution. If for example while both flip flops are in the reset state, amplifier 60 in response to its input signal generates a positive output, that logic 1 will be imposed on its corresponding input to NAND gate 73, causing the output of that gate to go low. This imposes a logic 0 on the set line of flip flop 70, causing the outputs of that flip flop to change state. The $\overline{Q}$ output of flip flop 70 will thus be driven low, imposing a logic 0 on its corresponding input to NAND gate 103. This prevents NAND gate 103 from responding to a high going signal from amplifier 90, thus preventing flip flop 100 from changing state. In like manner if after the reset condition amplifier 90 were the first to generate an output signal, flip flop 100 would change stages, and also prevent flip flop 70 from responding to a signal from amplifier 60. Simply stated, the flip flops are cross-coupled or cross-associated so that the first amplifier to generate an output signal after a reset condition will cause its corresponding flip flop to change stage, while preventing the other flip flop from doing so. Thus, the cross-associations of the two flip flops, in conjunction with their periodic resetting indicates the relative phase of the two input signals.

The Q output of flip flop 70 is coupled into NAND gate 76. The second input of that gate is driven from the output of amplifier 90. In like manner NAND gate 106 has inputs provided by the Q output of flip flop 100 and the output of amplifier 60. Thus, the output of each of these gates is only driven to a logic 0 when both their corresponding flip flops are in the set condition and the opposite amplifier is generating a logic 1 signal.

NAND gates 77 abd 107 (shown on FIG. 2b) which invert the signals from gates 76 and 106 respectively, are used to generate a portion of the output interlocking signals and thus they form part of the interlocking circuitry. Just as each of the flip flops corresponding to one of the directions of motor rotation, their associated NAND gates 76, 77, 106 and 107 correspond to that same direction of motor rotation.

The operation of this portion of the circuitry is best described with reference to FIG. 4. It is recalled that FIG. 4 is based on a direction of motor rotation defined as counterclockwise which caused operation of flip flop 70 while preventing flip flop 100 from changing states. Therefore the following will describe the operation of the circuitry associated with flip flop 70, realizing that it would apply to the circuitry associated with flip flop 100 if the motor were rotating in the opposite direction.

Trace 204 illustrates the signal on the reset inputs to both flip flops. It is seen that the signal is low before 0°, thus holding both flip flops continuously in the reset during the condition of no motor rotation. It is further seen that the reset signal is high whenever the output of either or both of the amplifiers (trace 202 and 203) is high.

Trace 205 illustrates the signal on the set input of flip flop 70 under the conditions described above. It is seen that the signal is normally high when the signals from both amplifiers 60 and 90 are low. Further, trace 205 is driven low when the signal from amplifier 60 rises immediately after a reset condition but before a rise in the output of amplifier 90. Trace 206 illustrates the response of the Q output of flip flop 70 to these signals. As shown, the Q output is low when the flip flop is reset, and rises in response to the set signal, remaining high until again reset. Thus, with this sequence of signals, the Q output of flip flop 70 is high from 0° to 300° of motor rotation and low from 300° to 360°, being driven high again during the next cycle of operation as shown. As described above this output signal is used as an input signal to gate 76, the other input being the output signal from amplifier 90. The output of gate 76 in response to these signals is shown as trace 207. As shown, that output is normally high, driven low when both input signals are high. This signal is inverted by NAND gate 77. The output of gate 77, which when passed through diode 78, forms part of the interlocking signal, is illustrated by trace 210.

It should be remembered that during the cycles of operation described above, the periodic setting of flip flop 70 prevents the setting of flip flop 100. This maintains the Q output of flip flop 100 in a low condition thus preventing the output of gate 106 from going low, further preventing an interlocking signal from being generated by gate 107.

Figure 2B:
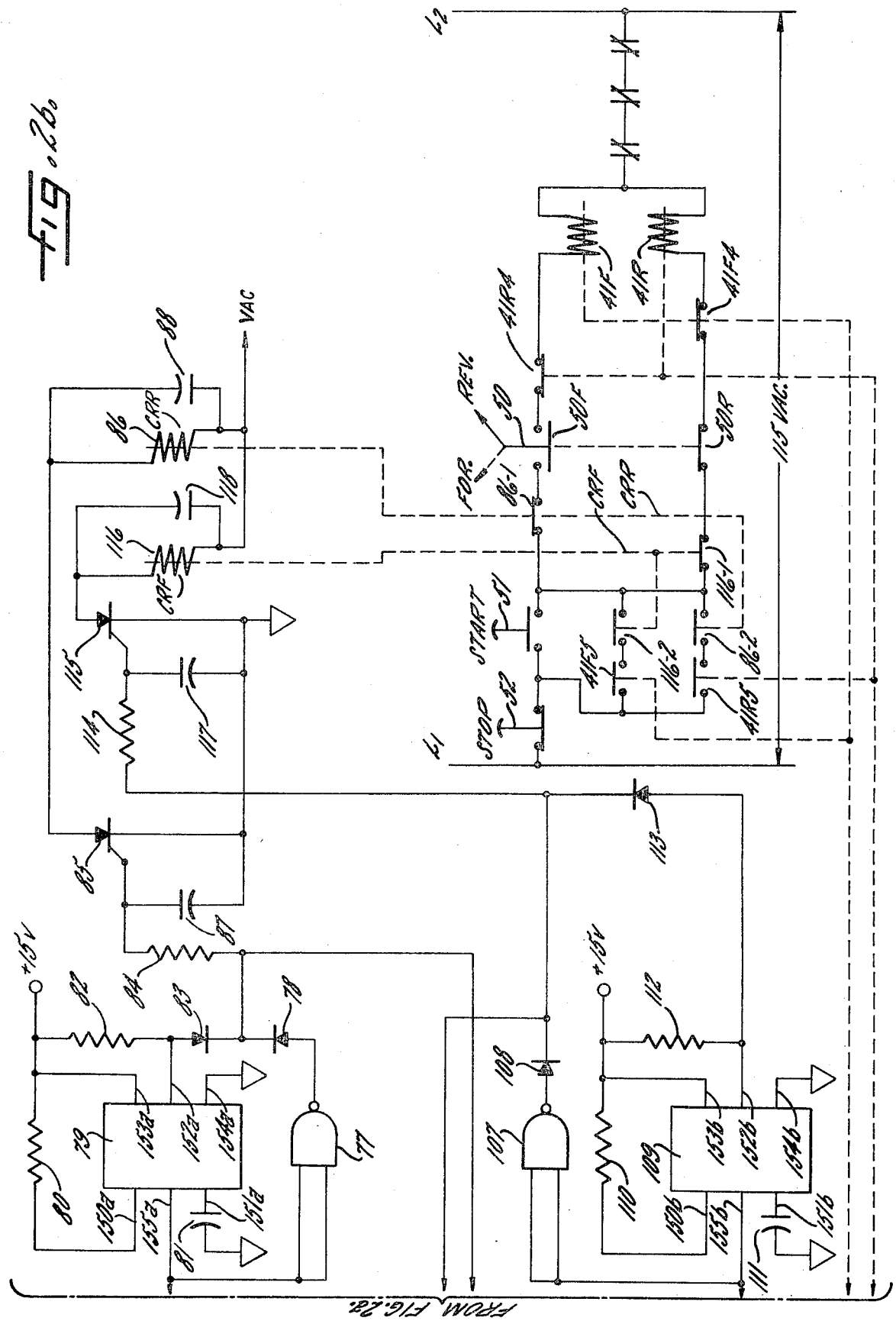

Referring to FIG. 2b, there are seen timing modules 79 and 109 which are used in the interlocking circuitry to provide a continuous interlocking signal. It was shown above that gates 77 and 107 provide a portion of the interlocking signal, that portion corresponding to approximately 180° of every motor revolution. The timing modules are used to supplement that signal.

Figure 3B:
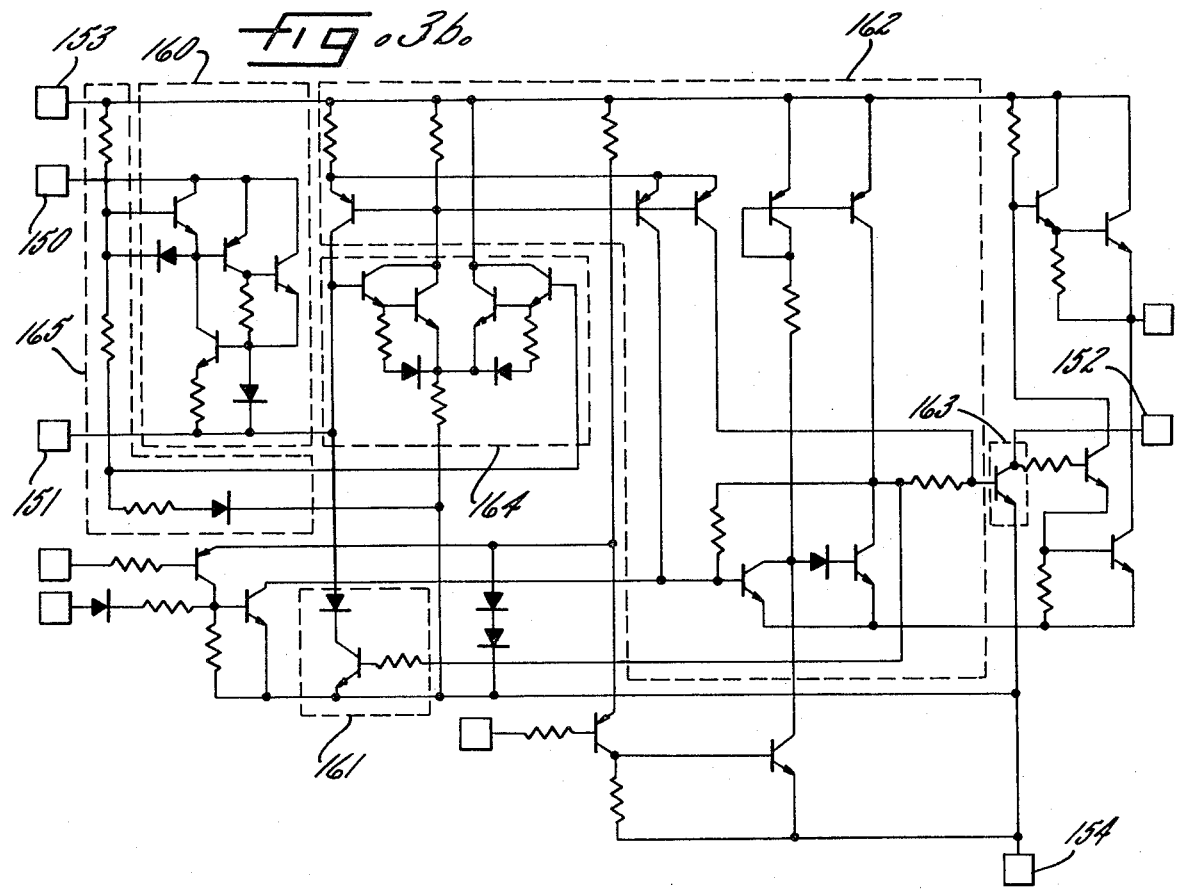
FIGS. 3a and 3b are respectively a functional block diagram and a circuit diagram illustrating the timing module utilized in the preferred embodiment.
Figure 3A:
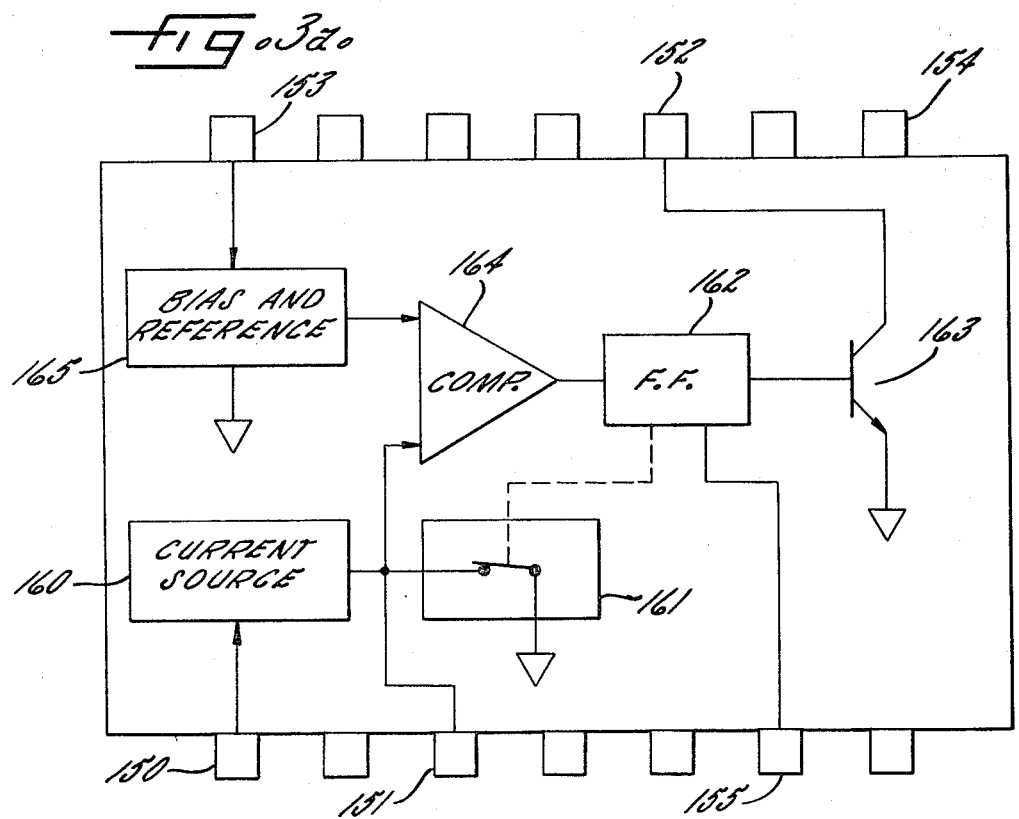

The particular timing modules used in this preferred embodiment are commercially available items. However, not being as common as NAND gates or amplifiers, their functional block diagram and internal circuitry are set out in FIGS. 3a and 3b respectively. Their method of operation in the mode utilized will be demonstrated with reference to FIG. 2b and FIG. 3a with the description centering on module 79, realizing that module 109 is identical. It should be noted that the functional blocks of FIG. 3a are generally indicated on FIG. 3b, however, the actual internal circuit operation will be dealt with only in functional terms. Referring first to FIG. 2b there is seen resistor 80 connected between a positive supply of d-c. voltage and pin 150a of module 79. Capacitor 81 is connected between pin 151a and ground. Further resistor 82 is connected between the positive supply of d-c. voltage and pin 152a. A positive supply of d-c. voltage is connected to pin 153a, and pin 154a is connected to the reference ground.

Referring to FIG. 3a, it is seen that pin 150 is the input to a current source 160 and pin 151 is the output of that current source. The connection of resistor 80 supplies an input to this current source, the magnitude of the current flow determined by the value of resistor 80. Capacitor 81, connected between pin 151 and ground, can be charged by the output of the current source. Switch 161 (which is illustrated for simplicity as a mechanical switch, but which is actually a transistor switch as shown in FIG. 3b) is controlled by flip flop 162 and is normally held in the closed position. This is seen to hold the voltage on the capacitor 81 at essentially a zero level. In addition when flip flop 162 is in its normal condition, base current is supplied to transistor 163. This turns on transistor 163 providing a path for current from the positive d-c. supply, through resistor 82, through transistor 163 to ground, holding pin 152 at a logic 0. The positive source of d-c. voltage connected to pin 153 acting through reference source 125 generates one input to comparator 164 which is active during the timing period as described below.

When a positive trigger signal is applied to pin 155, the state of flip flop 162 changes in response to the leading edge of the trigger signal, initiating the timing period. Th state of pin 155 has no further effect during the timing period. Flip flop 162 entering this timing state causes the following to occur: (a) switch 161 is opened allowing the constant current source to charge the capacitor, (b) the supply of base current to transistor 163 is removed, causing it to turn off, thus causing the logic output at pin 152 to go high, (c) comparator 164 constantly compares the voltage on capacitor 81 to the reference voltage supplied by reference source 165, and (d) when the comparator determines that the voltage on the capacitor 81 is equal to the reference voltage it generates a signal that causes flip flop 162 to revert to its initial condition, thus closing switch 161 to drain the charge from capacitor 81 and driving the logic output at pin 152 back to zero. As the magnitude of current flow through the constant current source is determined by the value of resistor 80, and the rate of charge of capacitor 81 is determined by its capacitance, the timing period is determined by the selection of these two values.

Referring again to FIG. 2b it is seen that the output of pin 152a of timing module 79 is connected through diode 83 to a summing junction formed at the cathodes of diodes 78 and 83. When pin 152a is in its normally low condition the current flow through resistor 82 and transistor 163 maintains the voltage on pin 152a at a level equivalent to a logic 0. However when pin 152a is allowed to go high current flow occurs from the positive d-c. source through resistor 82 and through diode 83, contributing to the output interlocking signal.

This signal smoothing contributed by the timing module is illustrated in FIG. 4. It is recalled that the leading edge of a positive going signal at pin 155a, which is the output of gate 76 causes the timing module to initiate its timing period. As seen in the figure this first positive going edge 208 occurs at approximately 300°; the response of the timing module is illustrated in trace 211. A second trigger signal is shown at 209, and the response of the timing module is also illustrated. The positive outputs of gate 77 and of timer module 79 are added through diodes 78 and 83 respectively to result in a continuous interlocking signal illustrated by trace 212. Note that the diodes, being unidirectional devices allow only the positive signals to be added.

This positive interlocking signal causes current flow through resistor 84 into the gate of silicon controlled rectifier 85. This allows current flow from the a-c. line through the coil of interlocking relay 86 and through the anode-cathode circuit of SCR 85 to ground, causing energization of relay 86.

The contacts of relay 86 are so disposed in the motor control circuit as to prevent reversal of a coasting motor before it has come to rest. This is accomplished in the following manner. Recall first that this example is based on motor rotation caused by either the energization of the 41R portion of motor starter 41, or by the continued motor rotation after coil 41R is deenergized. Contact 86-1, a normally closed contact, is opened by the energization of the coil of relay 86. This interrupts the path for current flow to coil 41F of reversing starter 41 until relay 86 is deenergized. Likewise, contact 86-2 is closed by energization of relay 86 thus maintaining a path for current flow to coil 41R of motor starter 41. Thus, power can be removed from motor 21 by depression of stop push button 52, and power can be reapplied by energizing coil 41R through normally closed contacts 116-1; but power cannot be reapplied to the motor by energizing coil 41F until the motor has come to rest, removing the interlocking signal thereby deenergizing relay 86.

Timing module 109 is associated with NAND gate 106 and output SCR 115 and its associated interlocking relay 116. These components have been inactive in the operation of the circuit described, because as demonstrated above flip flop 100 is prevented from changing states due to the particular phase rotation seen by amplifiers 60 and 90. However, if the initial premise of the demonstration is changed (i.e., the motor is driven in response to activation of coil 41F instead of 41R), the voltage illustrated by traces 200 and 201 of FIG. 4 would be applied to the inputs of amplifiers 90 and 60 respectively, causing operation of flip flop 100 and its related components while holding flip flop 70 reset. This would accomplish interlocking for the clockwise direction of motor rotation.

As shown above, the period of the timing modules 79 and 109 are determined by selection of values for resistors 80 and 110 and capacitors 81 and 111. It can be appreciated from the foregoing description that this period of the timing module plus the associated reaction time of the interlocking relays 86 and 116 and the reversing starter 41 determine the minimum speed at which the motor can be reversed. Knowledge of the deceleration rate of the particular motor 21, allows the selection of the appropriate time period which will prevent reversal of a rotating motor down to essentially "zero speed". On the other hand, if the particular application has a safe reversal speed, the value of the timing period can be selected to allow reversal below this safe speed. Thus, references herein to "zero speed" or a motor at rest should be read to include a motor coasting below its safe reversal speed.

One feature of the circuit which is the preferred embodiment which was not directly addressed in the material above is an important function of NAND gate 76 and its counterpart NAND 106. It should be appreciated from the discussion above that during normal operation, the states of flip flops 70 and 100 indicate the direction of motor rotation. Therefore, it would seem that the outputs of the flip flops could be used to drive the interlocking circuitry directly, making NAND gates 76 and 106 superfluous. However, if that were the case, the possibility of the following operation would exist. Just as in the preceding discussion assume that the motor is energized to rotate in a counterclockwise direction by energization of coil 41R of motor starter 41. This imposes the phase sequence on the amplifier inputs as demonstrated in the traces 200 and 201 of FIG. 4. However, assume that at the instant the contacts 41R-1 through 41R-3 close, the three-phase voltages are at the state illustrated at 180° rather than 0° as before. The following sequence of events would occur. Just as shown on FIG. 4 at 180°, the signal from amplifier 90 would be high while the signal from amplifier 60 would be low. In response to this, flip flop 100 would be driven into the set condition. If this flip flop were driving the interlocking means directly, this would cause interlocking relay 116 to be energized. This would further cause normally closed contacts 116-1 to open interrupting the path for current flow to motor starter coil 41R. This would cause deenergization of that starter, causing contacts 41R-1 through 41R-3 to open, removing the voltage supply from the motor 21, causing an unanticipated stop.

The possiblity of this operation is eliminated by using gates 76 and 106 as shown. With these gates in the circuit the sequence of events for the same condition is as follows. Just as described above the initial reaction of the circuit would be to set flip flop 100. This would put a logic 1 at its corresponding input to NAND gate 106. However, the output of NAND gate 106 is not driven low until, in addition to flip flop 100 being in the set condition, amplifier 60 generates a positive signal. However, as seen on FIG. 4, before amplifier 60 can generate a positive signal, the output of amplifier 90 falls to zero. As described above this condition acting through NAND gate 71 generates a reset signal which is applied to both flip flops. Thus flip flop 100 is reset. As appreciated from FIG. 4, the next occurrence is a positive signal generated by amplifier 60. This sets flip flop 70, imposing a logic 1 on the corresponding input to NAND gate 76. While this flip flop is held in the set condition, the output from amplifier 90 goes positive, thus satisfying NAND gate 76 and generating an interlocking signal which energizes interlocking relay 86. Energization of interlocking relay 86 opens the normally closed set of contacts 86-1, interrupting the circuit to forward coil 41F, preventing its energization, and also closes normally open set of contact 86-2 maintaining a current path for motor starter coil 41R. This is the desired circuit operation.

Various means are utilized in the circuitry to accomplish suppression of electrical transients. In the first instance the timing modules 79 and 109, by providing a continuous interlocking signal remove the possiblity of interlocking relay chatter which would be a source of internally generated noise. Noise suppression is also accomplished by capacitors 74 and 104 connected from the set input of their respective flip flops to ground. These capacitors decrease the frequency response of their associated flip flops, thus making them insensitive to very fast transient spikes which might be picked up on the flip flop inputs. In addition, transistors 75 and 105 effectively clamp their corresponding flip flop in the reset state whenever an interlocking signal is being generated in response to the opposite flip flop. Thus, for example, in response to the circuit operation described above, a continuous positive interlocking signal is present at the summing junction formed at the cathodes of diodes 78 and 83. This positive signal is also imposed on the base of transistor 105 which causes its collector to be driven to a logic 0. This continuous logic 0 prevents the operation of NAND gate 106, and holds the Q output of flip flop 100 low, preventing it from changing states. Further transient suppression is also accomplished by capacitors 87 and 117. In addition, capacitors 88 and 118 are coupled across the coils of relays 86 and 116 respectively, to smooth the half wave DC supply for the purpose of preventing relay chatter. While not intended to limit the scope of the invention in any way, the following list indicates a set of components and values which have been utilized in one application of the teachings of this invention.

| | |
|---|---|
| Resistor 62, 92 | 82K ohms, 5W, 5% |
| Resistor 66, 96 | 22M ohms, ½W, 5% |
| Resistor 68, 98 | 470 ohms, ½W, 5% |
| Resistor 69, 99 | 220 ohms, ½W, 5% |
| Resistor 80, 110 | 270K ohms, ½W, 5% |
| Resistor 82, 112 | 10K ohms, ½W, 5% |
| Resistor 84, 114 | 1K ohms, ½W, 5% |
| Capacitor 65, 95 | 0.47 Mfd |
| Capacitor 74, 104 | 0.1 Mfd |
| Capacitor 81, 111 | 1 Mfd |
| Capacitor 87, 117 | 0.22 Mfd |
| Capacitor 88, 118 | 250 Mfd |
| Diode 64, 65, 67, 78, 83, 94, 95, 97, 108, 113 | 1.5 amp |
| Amplifier 60, 90 | Fairchild No. U6A77441393 |
| All NAND gates and flip flops | Fairchild No. U6A994659X |
| Transistor 75, 105 | TI-495 |
| SCR 85, 115 | No. 2N2324 |
| Timing Module 79, 109 | Exar No. 320 |
| Interlocking relay 86, 116 | S & D No. 219BBXP |

One important feature of the present invention is that it can provide a "zero speed" switch with sensitivity over the entire speed range of the motor to which it is applied. As demonstrated above, selection of the timing period of the timing modules determines the speed at which the motor can be reversed. Knowledge of the deceleration rate of the motor allows selection of a timing period which will prevent reversal down to essentially "zero speed". In addition, the utilization of amplifiers 60 and 90 yields an input sensitivity which complements this output sensitivity. It is realized that the magnitude of the input signal generated by a three-phase motor at very slow coasting speeds will be very small. However, amplifiers 60 and 90 are applied in the open loop mode, yielding a voltage gain of up to several thousand, thus allowing response to very small input signals. This same sensitivity is maintained over the entire motor speed range, the clipper circuit described above effectively limiting the magnitude of large input signals.

The invention has been described with reference to one very specific embodiment. However, it is realized that those skilled in the art can easily substitute components to achieve the same result, thus falling within the spirit and scope of this invention. For instance, SCR's 85 and 115 can be replaced with transistors allowing the interlocking relays to be driven from a d-c. source of voltage. Timing modules of a different nature could be utilized. Other means of disposing the interlocking contacts in the motor control circuit could be utilized. However, these and other minor mechanical changes all are intended to fall within the spirit and scope of this invention.

While the invention has been described in connection with a power press, the teachings of this invention may obviously be applied to electrically driven machinery other than presses.

It should be appreciated from the foregoing that what has been provided is a "zero speed" switch with characteristics which are superior to those of devices presently available. The indirect means of rotation sensing utilized allows the switch to be enclosed with the motor control, thus simplifying installation and maintenance and providing protection. In addition the "zero speed" switch disclosed provides a unit with greater sensitivity and reliability then devices presently available.

I claim as my invention:

1. In a control circuit for a reversible polyphase a.c. induction motor having supply lines for providing polyphase voltage to the motor, the combination comprising a plurality of sensing means for sensing the voltage on the motor supply lines resulting from the applied voltage and the generator action of the motor and in response thereto emitting a plurality of output signals, logic means for comparing the relative phase of the plurality of output signals thereby to determine the presence and direction of motor rotation, and interlocking means responsive to the logic circuitry for selectively interrupting the motor control circuit thereby to allow voltage to cause either direction of rotation to be applied to the motor while at rest, but to allow voltage to be applied to the motor while coasting only if that voltage will cause the motor to continue in its direction of coast.

2. In a control circuit for a reversible three phase a.c. induction motor having supply lines for providing three phase voltage to the motor, the combination comprising first and second amplifier means for sensing the voltage on the motor supply lines resulting from the applied voltage and the generator action of the motor and in response thereto emitting respectively first and second output signals, logic circuitry means for comparing the relative phase of the first and second output signals and in response thereto assuming one of three distinct states corresponding to (a) clockwise motor rotation (b) counterclockwise motor rotation or (c) no motor rotation, and interlocking means responsive to the logic circuitry for selectively interrupting the control circuit so that voltage may be applied to the motor to cause rotation in either clockwise or counterclockwise direction when the logic circuitry is in the "no motor rotation" condition, while voltage may be applied to the motor when the logic circuitry is in either of its other two conditions only if that voltage will cause the motor to continue in its direction of rotation.

3. In a control circuit for a reversible three phase a.c. induction motor having supply lines for providing three phase voltage to the motor, the combination comprising first and second amplifier means for sensing the voltage on the motor supply lines resulting from the applied voltage and the generator action of the motor and in response to the presence of a voltage emitting respectively first and second output signals, logic circuitry including first and second bi-stable elements responsive respectively to the first and second output signals, each of the bi-stable elements driven into its first stable state in response to the simultaneous absence of the first and second output signals, and driven into its second stable state in response to the presence of its associated output signal, the bi-stable elements cross-associated so that when one of the bi-stable elements is in its second stable state the other bi-stable element is prevented from responding to its associated output signal, and interlocking means responsive to the logic circuitry for selectively interrupting the control circuit thereby to allow voltage to cause either direction of motor rotor to be applied to the motor while at rest, but to allow voltage to be applied to the motor while coasting only if that voltage will cause the motor to continue in its direction of coast.

4. In a control circuit for a reversible three phase a.c. induction motor having supply lines for providing three phase voltage to the motor, the combination comprising first and second means for sensing the voltage on the motor supply lines resulting from the applied voltage and the generator action of the motor and in response to the presence of a voltage emitting respectively first and second output signals, logic circuitry including first and second bi-stable elements responsive respectively to the first and second output signals, each of the bi-stable elements driven into its first stable state in response to the simultaneous absence of the first and second output signals and driven into its second stable state in response to the presence of its associated output signal, the bi-stable elements cross-associated so that when one of the bi-stable elements is in its first state the other bi-stable element is prevented from responding to its associated output signal, the logic circuitry also including first gating circuit responsive to the first bi-stable element and the second output signal and second gating circuit responsive to the second bi-stable element and the first output signal, and first and second interlocking means responsive respectively to first and second gating circuits for selectively interrupting the control circuit thereby to allow voltage to cause either direction of motor rotor to be applied to the motor while at rest, but to allow voltage to be applied to the motor while coasting only if that voltage will cause the motor to continue in its direction of coast.

5. In a control circuit for a reversible three phase a.c. induction motor having supply lines for providing three phase voltage to the motor, the combination comprising first and second amplifier means for sensing the voltage on the motor supply lines resulting from the applied voltage and the generator action of the motor and in response to the presence of a voltage emitting respectively first and second output signals, logic circuitry including first and second bistable elements responsive respectively to the first and second output signals, each of the bi-stable elements driven into its first stable state in response to the simultaneous absence of the first and second output signals and driven into its second stable state in response to the presence of its associated output signal, the bi-stable elements cross-associated so that when one of the bi-stable elements is in its first stable state the other bi-stable element is prevented from responding to its associated output signal, and interlocking circuitry responsive to the logic circuitry the interlocking circuitry including interlocking relays whose contacts are so disposed in the motor control circuit as to allow voltage to cause either direction of motor rotation to be applied to the motor while at rest, but to allow voltage to be applied to the motor while coasting only if that voltage will cause the motor to continue in its direction of coast.

6. In a control circuit for a reversible three phase a.c. induction motor having supply lines for providing three phase voltage to the motor, the combination comprising first and second amplifier means for sensing the voltages on the motor supply lines resulting from the applied voltage and the generator action of the motor and in response thereto emitting first and second output signals said output signals being out of phase in response to the phase relationship of the voltages on the motor supply lines the phase relationship being indicative of the direction of motor rotation, logic circuitry including first and second bi-stable elements responsive to the phase relationships of the output signals both of said bi-stable elements normally maintained in their first stable state, the first bi-stable element driven into its second stable state in response to one direction of motor rotation, the second bi-stable element driven into its second stable state in response to the opposite direction of motor rotation, and interlocking means responsive to the logic circuitry for selectively interrupting the control circuit thereby to allow voltage to cause either direction of motor rotor to be applied to the motor while at rest, but to allow voltage to be applied to the motor while coasting only if that voltage will cause the motor to continue in its direction of coast.

\* \* \* \* \*